(12) United States Patent
Schwanitz et al.

(10) Patent No.: US 11,370,618 B2
(45) Date of Patent: Jun. 28, 2022

(54) CONVEYOR BELT UNIT WITH CONFIGURATION-CHANGING MECHANISM

(71) Applicant: Mettler-Toledo Garvens GmbH, Giesen (DE)

(72) Inventors: Florian Schwanitz, Eime (DE); Mario Meyer, Langenhagen (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 0 days.

(21) Appl. No.: 17/155,237

(22) Filed: Jan. 22, 2021

(65) Prior Publication Data

US 2021/0229923 A1   Jul. 29, 2021

(30) Foreign Application Priority Data

Jan. 24, 2020   (EP) .................................... 20153546

(51) Int. Cl.
  *B65G 21/12*   (2006.01)
  *B65G 21/10*   (2006.01)
  *B65G 41/00*   (2006.01)

(52) U.S. Cl.
  CPC ........... *B65G 21/12* (2013.01); *B65G 41/002* (2013.01); *B65G 2207/26* (2013.01)

(58) Field of Classification Search
  None
  See application file for complete search history.

(56) References Cited

U.S. PATENT DOCUMENTS

| | | |
|---|---|---|
| 6,509,533 B1 | 1/2003 | Tanaka et al. |
| 9,457,487 B2 * | 10/2016 | Mayer .................. B26D 7/0625 |
| 10,018,498 B2 | 7/2018 | Gahler |
| 10,502,613 B2 * | 12/2019 | Geserich ............ G01B 11/0691 |

FOREIGN PATENT DOCUMENTS

| | | |
|---|---|---|
| GB | 917260 | 1/1963 |
| GB | 2241682 A | 9/1991 |
| JP | 63-27835 U | 2/1988 |
| JP | 2010-37073 A | 2/2010 |
| KR | 10-2005-0038299 A | 4/2005 |
| WO | 2006/094417 A1 | 9/2006 |

* cited by examiner

*Primary Examiner* — Kavel Singh
(74) *Attorney, Agent, or Firm* — Standley Law Group LLP; Jeffrey S. Standley; Stephen L. Grant

(57) ABSTRACT

A conveyor belt unit (100) has a configuration-changing mechanism useful for switching between a ready-to-operate configuration and a not-ready-to-operate configuration. A specific embodiment uses a rotating joint element (150) with a thin material bridge (152) that defines a rotary axis. Used with a dynamic checkweigher, the conveyor belt unit has a carrier frame (110) and a belt body (130) connected to it. Rollers (132, 134) are arranged at the ends in transport direction (T) and contrary to the transport direction, with a conveyor belt (136) tensioned across the conveyor rollers. A motor drives the conveyor belt (136) by means of one of the rollers (132, 134). The configuration-changing mechanism is effective between the belt body and the carrier frame.

9 Claims, 3 Drawing Sheets

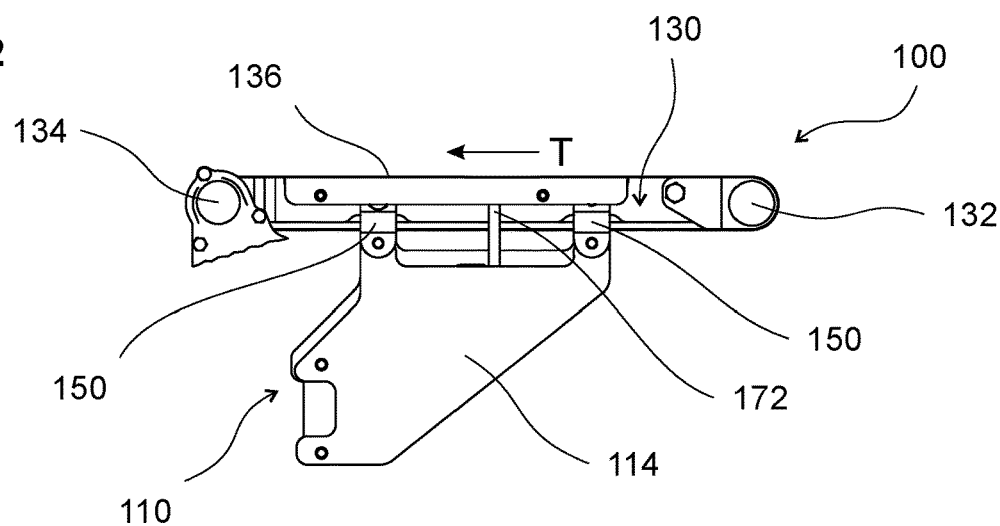
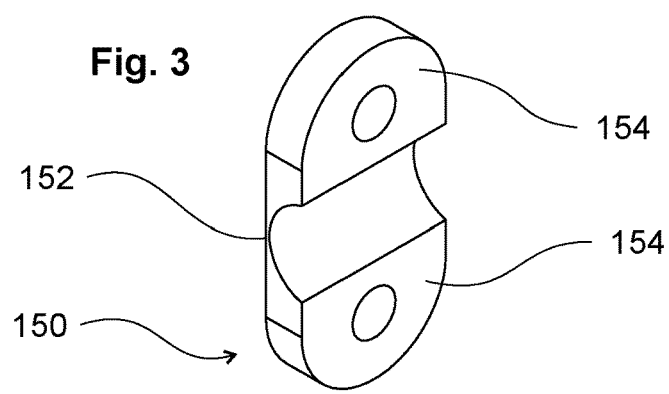
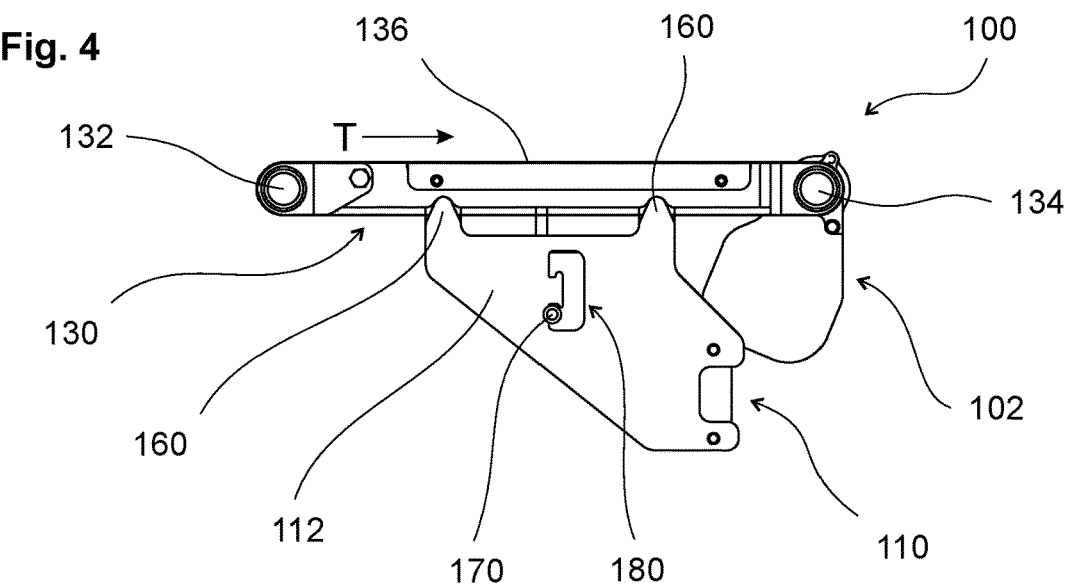

CONVEYOR BELT UNIT WITH CONFIGURATION-CHANGING MECHANISM

CROSS-REFERENCE TO RELATED APPLICATIONS

This patent application claims priority to European application EP 20153546.5, filed on 24 Jan. 2020, which is incorporated by reference as if fully recited herein.

TECHNICAL FIELD

The present invention relates to a conveyor belt unit for a dynamic checkweigher with a configuration-changing mechanism, in particular a conveyor belt unit with a belt body, which has at least one conveyor roller each arranged at the ends in transport direction and contrary to the transport direction, and wherein the conveyor belt unit is provided with a conveyor belt movably arranged across the belt body and the rollers.

BACKGROUND

Dynamic checkweighers are a key element of quality control in the manufacture of pharmaceutical and cosmetic products, foodstuffs, beverages as well as in the logistic, chemical, automotive and metal-processing industry. They not only improve the exploitation of existing resources but also aid in meeting national directives, calibration regulations and industry standards. An effective checkweigher system offers protection against product defects and lowers overall operating costs.

A dynamic checkweigher is a system, which weighs the goods while guiding them over the weighing unit within the production line, which classifies the goods into predefined weighing zones and which sorts or channels the goods according to weight classification. Checkweighers are used in a wide variety of fields comprising for example:

checking the products for underweight/overweight adherence to legal regulations as regards net weight of packaged goods reduction of product waste by using the weight values obtained by means of the checkweigher for adjusting the filling machines classification of goods according to weight measuring and recording the output of the production plant/line verification of quantities by means of weight.

With checkweighers 100% of the products of a product line are weighed. This means that also all product data is collected for product counting, batch tracking and production statistics.

A checkweigher system normally consists of the following conveyor belt units: feed belt unit, weighing belt unit, discharge belt unit with sorting device and weighing terminal with user interface. The weighing belt unit situated between feed belt unit and discharge belt unit is mounted via a carrier frame on a load cell, which dynamically records the weight of the product as it is guided over the weighing belt unit. The two most frequently used weighing technologies for checkweighers are load cells with strain gauge or load cells operating according to the principle of electromagnetic force compensation (EFC). After being transported over the weighing belt unit the products are carried away by a discharge belt unit arranged downstream of the weighing belt unit. Products with incorrect weight are detected during the dynamic weighing process and are ejected by a sorting-out device, as a rule transversely to the transport of the products which takes place in longitudinal direction.

One of the above-mentioned conveyor belt units may for example be a weighing conveyor belt moved over a dynamic weighing device. Frequently a conveyor belt is designed as a so-called endless belt, i.e. a closed loop, which is guided over at least two conveyor rollers, namely a passive idle roller and a drive roller, which is connected to a drive for actively driving the conveyor belt.

Conventional conveyor belts are constructed as endless belts, which comprise a finger joint, which is welded or glued in such a way that it can no longer be separated. Such a conveyor belt has for example been disclosed in GB 917 260 A. A problem with such a permanently connected endless belt is that in case of having to dismantle the conveyor in order to, for example, change the belt for repair or cleaning purposes, the entire conveying system has to be dismantled. There exists therefore a need for providing a conveyor belt, which can be dismantled in an easy manner.

Commonly known checkweigher systems automatically check a plurality of products for conformity and they separate out defective products, which do not comply with a predefined specification or standard. Check conveyor systems are employed in various environments for performing sorting processes. The sorting process is typically an integral part of the food industry. Sorting is carried out for meat and fish products, for milk products such as cheese, for agricultural products such as nuts etc. The delicate nature of the products which the machines process means that frequent cleaning is required of the components which may come into contact with the product to be processed, such as conveyor belts, vessels for rejects, collecting vessels etc. and indeed of the entire plant. The cross-contact with allergens could increase the risk of contamination by a multiple and thus could represent a serious health risk for the end user of the product.

The main problem with cleaning checkweigher systems consists in the difficulty of gaining optimal access to conveyor belts, reject vessels and collecting vessels. This problem undermines the cleaning efforts of operating personnel considerably and leads to ever growing infestation. In order to perform cleaning the transport belt is relaxed before it can be removed from the belt body of the checkweigher system. The state of the art offers various solutions for replacing the belt of a conveyor belt unit or for bringing it into a position, in which the components can be cleaned.

EP 1 101 715 A1 discloses a belt body with a conveyor belt tensioned around two rollers and resting on a carrier frame. Two clamps attached to the side of the carrier frame secure the hold and positioning of the belt body on the carrier frame. By undoing the clamps the belt body can be completely removed from the carrier frame, so that there is improved access to individual parts for cleaning. The disadvantage is that the components are completely separated from one another, which firstly requires employing more personnel and more depositing surfaces and secondly requires performing personnel to be trained in the correct handling both during dismantling and also during re-assembly.

Another solution is presented in FIG. 8 of JPH 066 099 Y2, according to which the carrier frame can be removed. It can be readily recognized that this gives rise to the same disadvantages as described in the previous paragraph with reference to EP 1 101 715 A1.

In order to improve cleaning of a conveyor belt unit, i.e. in order to gain improved access to hidden parts, the conveyor belt can further be removed. Various solutions in this regard are proposed in the JP 2010 037073 A, KR 2005 00 38 299 A and WO 06 094 417 A1 specifications. The aim of this invention however does not consist in proposing a solution for removing a conveyor belt as such, but to improve access to hidden parts without removing the conveyor belt.

In view of the above mentioned disadvantages the applicant has been looking for a new solution, which makes it possible to develop the conveyor belt unit in such a way as to offer to operating personnel more simplified handling for cleaning the different components of the checkweigher system which come into contact with the product to be processed.

SUMMARY

This objective is met by a conveyor belt unit for a dynamic checkweigher, comprising a carrier frame and a belt body connected to the carrier frame and used to convey an object, with conveyor rollers arranged at the ends in transport direction and contrary to the transport direction and a conveyor belt tensioned across the conveyor rollers, wherein the conveyor belt is driven by means of a motor via one of the two conveyor rollers, wherein the conveyor belt unit further comprises a configuration-changing mechanism effective between belt body and carrier frame, which is designed in such a way that, when the configuration-changing mechanism is actuated, the conveyor belt unit switches between a not-ready-to-operate configuration and a ready-to-operate configuration.

According to the invention the configuration-changing mechanism comprises at least one rotating joint element with a thin material bridge, wherein the thin material bridge defines a rotary axis extending essentially parallel to the transport direction.

The advantages of the conveyor belt unit according to the invention for the applicant consist in that the belt body can be swivelled relative to the carrier frame thus offering access to internal parts without having to separate the belt body from the carrier frame.

A conveyor belt unit in terms of this application is understood to refer to not only the feed belt unit and the weighing belt unit but also to the discharge belt unit. In case of the weighing belt unit the conveyor belt unit is supported via a load cell against the base frame of the plant, in case of the feed belt unit and the discharge belt unit these are understood to be mounted directly on the base frame.

Advantageously a rotating joint element may consist of respectively two joint legs which are connected to each other via a thin material bridge. Further a rotating joint element may be attached to the belt body by means of one of the joint legs and to the carrier frame by means of the other of the joint legs, thus enabling the belt body to be swivelled relative to the carrier frame out of the ready-to-operate configuration into the not-ready-to-operate configuration and back.

With one further development the rotating joint element may be attached to the carrier frame in such a way that the defined rotary axis is aligned parallel to the transport direction. Furthermore the rotary axis may be arranged so as to extend above the side element lying on the right-hand side in transport direction or above the side element lying on the left-hand side in transport direction.

Further in another further development the rotating joint element may be attached to the belt body and to the carrier frame in such a way that the defined rotary axis is aligned at right angles to the transport direction. Further, the rotary axis may be arranged so as to lie below the end of the belt body, which extends in transport direction, or below the end of the belt body, which extends contrary to the transport direction.

With one advantageous further development the belt body, in the ready-to-operate configuration, may rest on the carrier frame on support elements arranged opposite the rotating joint element. Further the conveyor belt unit may further comprise a tension lever fixed to the belt body, which may be transferred from a lower snap-in position corresponding to the ready-to-operate configuration into an upper snap-in position corresponding to the not-ready-to-operate configuration, so that the belt body is swivelled during transfer from one snap-in position into the other snap-in position. Further the lower snap-in position and the upper snap-in position may be defined in a matrix, through which the end of the tension lever remote from the belt body reaches.

With another advantageous further development the matrix may be arranged in a side element of the carrier frame, which lies below the support elements or the rotating joint element, or the matrix may be arranged in a cross element of the carrier frame arranged below the support elements or the rotating joint element and connecting the side elements.

In the ready-to-operate configuration of the conveyor belt unit the tension lever may snap under tension into the lower snap-in position thus pressing the belt body against the support elements. In the not-ready-to-operate configuration the tension lever may be supported against the upper snap-in position thus holding the belt body in the swivelled position.

The conveyor belt unit is a feed belt unit or a weighing belt unit or a discharge belt unit.

BRIEF DESCRIPTION OF THE DRAWINGS

Details of the conveyor belt unit according to the invention are revealed in the description of the exemplary embodiments shown in the drawings, in which identical parts are identifies with identical part numbers and wherein:

FIG. 2 is a rear elevation view of the FIG. 1 device in the ready-to-operate configuration;

FIG. 3 is a perspective view of a rotating joint element;

FIG. 4 is a front elevation view of the FIG. 1 device in the ready-to-operate configuration;

DETAILED DESCRIPTION OF THE EMBODIMENTS

Figure 1:
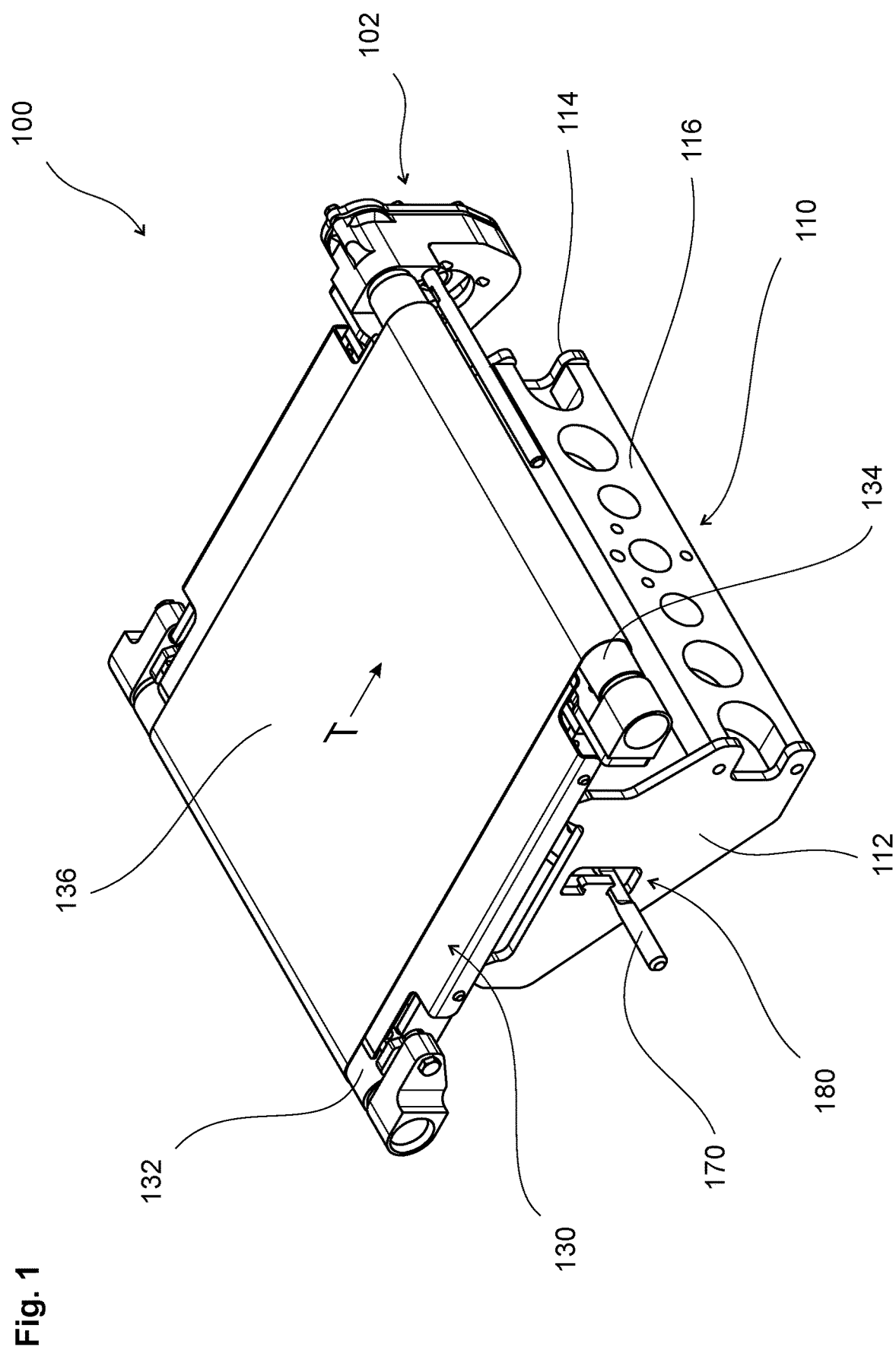
FIG. 1 is a perspective view of the conveyor belt unit in the ready-to-operate configuration.

FIG. 1 shows an isometric representation of a conveyor belt unit 100 in the ready-to-operate configuration. The transport direction T is marked moving from left to right in direction of the viewer. The conveyor belt unit 100 comprises a carrier frame 110 consisting among others of two side elements 112, 114 and a cross element 116 connecting the two. By means of this cross element 116 the conveyor belt unit 100 may be fixed via a load cell or directly to the base frame of a checkweigher system, for example of a dynamic checkweigher. The belt body 130 with rollers (132, 134) arranged at the ends of the belt body 130 in the transport direction T and contrary to the transport direction T is connected to the base frame 110 and provided for conveying an object. A conveyor belt 136 is tensioned across the rollers (132, 134), wherein the conveyor belt 136 is driven by means of a motor 102 via one of the two rollers 134. A tension lever 170 reaches through a matrix 180 through the side element 112 lying on the right-hand side in transport direction T.

FIG. 2, a rear view of the conveyor belt unit 100 of FIG. 1, shows how the carrier frame 110 and the belt body 130 are connected to each other. Two rotating joint elements 150 are connected on one side to the side element 114 lying on the left-hand side in transport direction T and to the belt body 130.

FIG. 3 shows a separate enlarged representation of such a rotating joint element 150. It consists of two joint legs 154, which are connected to each other via a thin material bridge 152. This thin material bridge 152 allows the joint legs 154 to be rotated relative to each other, and thus the belt body 130 to be rotated relative to the carrier frame 110, when in the assembled state. In this exemplary embodiment the rotating joint element 150 is fastened by means of screws to the carrier frame 110 and to the belt body 130. The tension lever 170 mentioned above in conjunction with FIG. 1 is fixed to the belt body 130 via the connecting point 172. When the tension lever 170 is moved upwards, the belt body 130 is moved about the thin material bridge 152 of the rotating joint elements 150. The two thin material bridges 152 are each arranged such that their respective rotary axes defined by the thin material bridge 152 define one and the same rotary axis for the belt body 130.

FIG. 4 shows the front view of the conveyor belt unit 100 of FIG. 1. In the ready-to-operate configuration, in which an object can be transported over the conveyor belt unit 100, the belt body 130 is supported against two support elements 160. Due to these support elements 160 it is ensured that the belt body 130, after it has been swiveled, can again be stopped in the horizontal which means that the ready-to-operate configuration has been reinstated.

Figure 5:
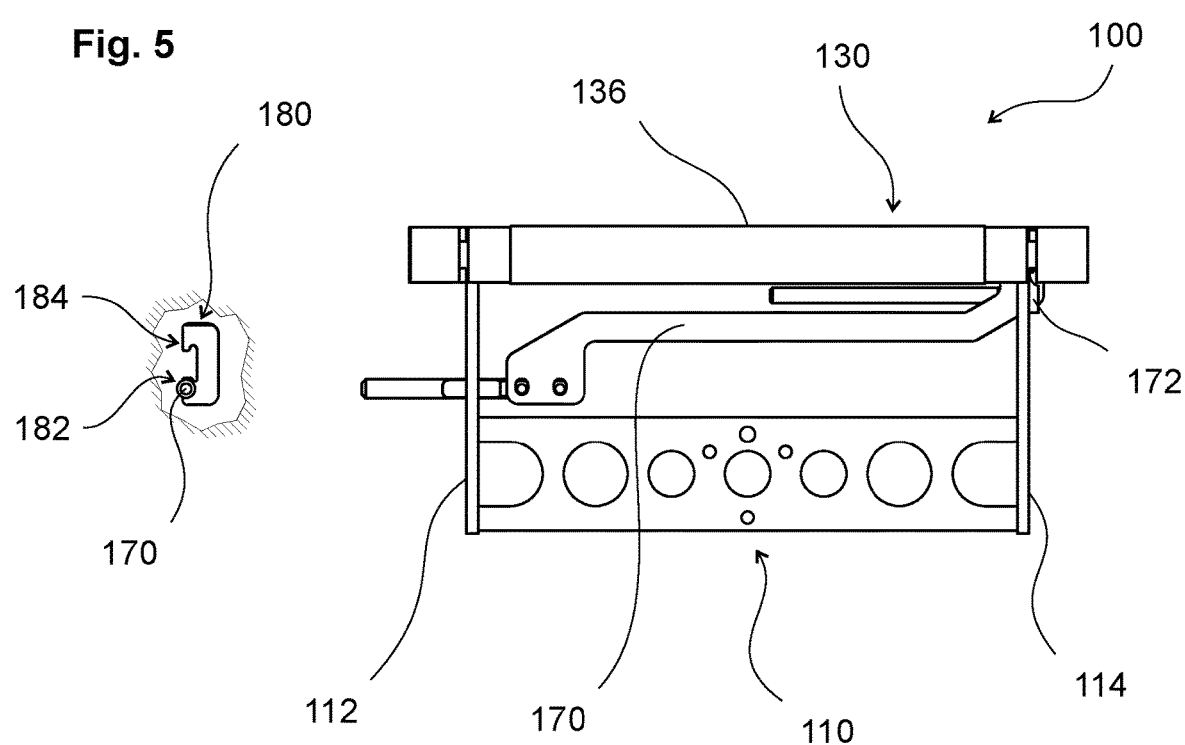
FIG. 5 is a side view of the FIG. 1 device in the ready-to-operate configuration when viewed contrary to the transport direction.

In the combined FIG. 5 the conveyor belt unit 100 is shown in the ready-to-operate configuration viewed contrary to the transport direction, and to the left thereof a cut-out of the side element 112 all around the matrix 180 is shown. The tension lever 170 reaches through the matrix 180 in the side element 112 and is positioned in the matrix 180 in a lower snap-in position 182. Due to the flexibility of the tension lever 170 and the positioning in the lower snap-in position 182 the tension lever 170 applies a torque at the connecting point 172 with the belt body 130, as a result of which the belt body 130 is pressed onto the support elements 160.

Figure 6:
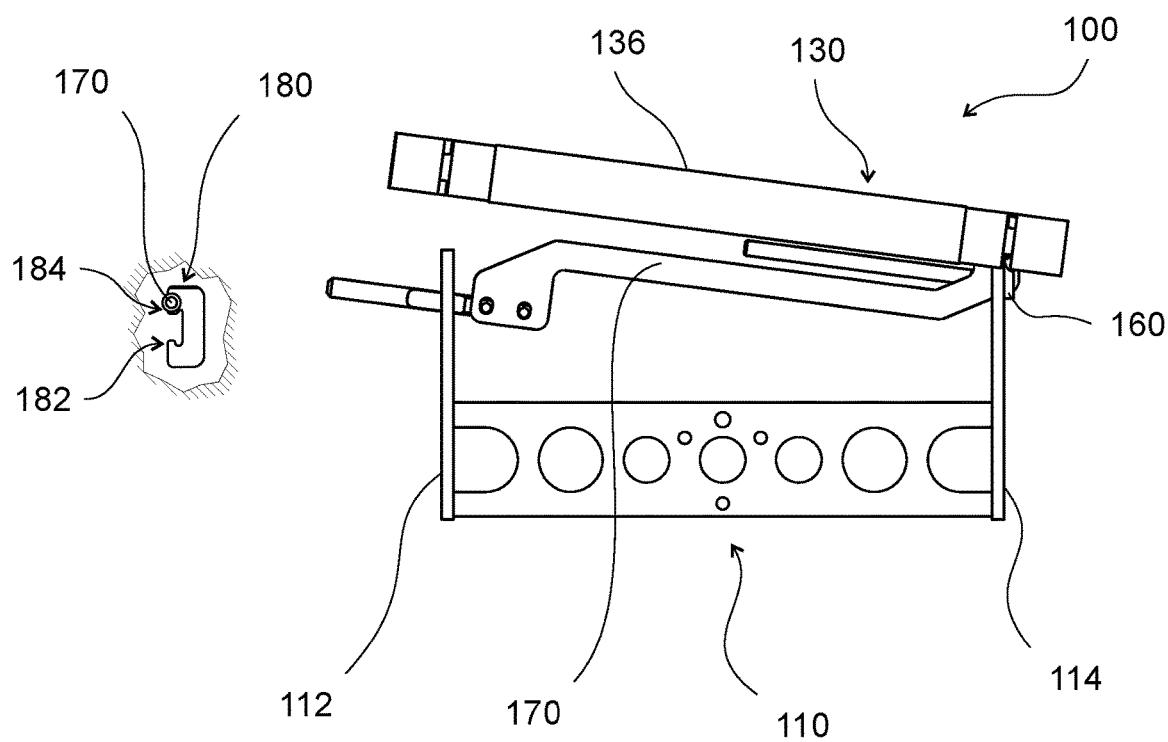
FIG. 6 is a side view of the conveyor belt unit in the not-ready-to-operate configuration when viewed contrary to the transport direction.

In the combined FIG. 6 the conveyor belt unit 100 is shown in the not-ready-to-operate configuration viewed contrary to the transport direction, and to the left thereof a cut-out of the side element 112 around the matrix 180 is shown. The tension lever 170 extends through the matrix 180 in the side element 112 and is positioned in the matrix 180 in an upper snap-in position 184. Due to the deadweight of the belt body 130 and the restoring force of the rotating joint element 160 the tension lever 170 is pressed onto the upper snap-in position 184. In this not-ready-to-operate configuration in FIG. 6, on the one hand access is improved to hidden parts but also, it is easier in this position to remove the conveyor belt 136 from the belt body 130.

To switch between the ready-to-operate configuration and the not-ready-to-operate configuration therefore, the tension lever 170 must be changed from the lower snap-in position 182 into the upper snap-in position 184. To this end, the operator merely has, from his point of view, to push the tension lever 170 initially to the right, then upwards and lastly to the left.

The above described invention also comprises various modifications, for example the matrix 180 may of course be designed back-to-front or comprise an intermediate position. Also it is not mandatory for the connecting point 172 of the tension lever 170 to be situated above the side element 114 on the back or, seen in transport direction T, on the left-hand side of the belt body 130, rather it may also be arranged on the front or, seen in transport direction T, on the right-hand side above the side element 112. The inventive solution is not limited to a specific conveyor belt unit, but may be applied both to a feed belt unit, a check weighing unit, a discharge belt unit or any conveyor belt unit present in a product transport section.

REFERENCE SIGNS LIST 100 conveyor belt unit
102 drive unit
110 carrier frame
112 right-hand side element of carrier frame
114 left-hand side element of carrier frame
130 belt body
132, 134 rollers
136 conveyor belt
140 configuration-changing mechanism
150 rotating joint element
152 thin material bridge
154 joint leg
160 support element
170 tension lever
172 connecting point
180 matrix
182 lower snap-in position
184 upper snap-in position
T transport direction

What is claimed is:

1. A conveyor belt unit for conveying an object over a dynamic checkweigher, comprising:
a carrier frame;
a belt body, connected to the carrier frame for conveying the object, comprising:
a pair of rollers, one arranged at an end of the belt body in a transport direction and one arranged at an end contrary to the transport direction; and
a conveyor belt tensioned across the pair of rollers;
a motor arranged to drive the conveyor belt by means of one of the rollers; and
a configuration-changing mechanism, effective between the belt body and the carrier frame to switch the conveyor belt unit between a not-ready-to-operate configuration and a ready-to-operate configuration, when the configuration-changing mechanism is actuated, the configuration-changing mechanism comprising at least one rotating joint element comprising a pair of joint legs connected by a thin material bridge that defines a rotary axis thereof that is aligned parallel to the transport direction;
wherein one of the joint legs is used to attach the rotating joint element to the belt body and the other joint leg is used to attach the rotating joint element to the carrier frame, such that swivelling the belt body relative to the carrier frame about the rotating joint element moves the conveyor belt unit from the ready-to-operate configuration into the not-ready-to-operate configuration and vice versa.

2. The conveyor belt unit of claim 1, wherein the carrier element comprises a first side element located on a first side of the belt body and a second side element located on a second side of the belt body and the rotary axis of the rotating joint element lies above the side elements.

3. The conveyor belt unit of claim 1, wherein the conveyor belt unit is arranged as one of:
a feed belt unit;
a weighing belt unit; or
a discharge belt unit.

4. A conveyor belt unit for conveying an object over a dynamic checkweigher, comprising:
a carrier frame;
a belt body, connected to the carrier frame for conveying the object, comprising:
a pair of rollers, one arranged at an end of the belt body in a transport direction and one arranged at an end contrary to the transport direction; and
a conveyor belt tensioned across the pair of rollers;
a motor arranged to drive the conveyor belt by means of one of the rollers; and
a configuration-changing mechanism, effective between the belt body and the carrier frame to switch the conveyor belt unit between a not-ready-to-operate configuration and a ready-to-operate configuration, when the configuration-changing mechanism is actuated, the configuration-changing mechanism comprising at least one rotating joint element comprising a pair of joint legs connected by having a thin material bridge that defines a rotary axis thereof that is aligned at right angles to the transport direction;
wherein one of the joint legs is used to attach the rotating joint element to the belt body and the other joint leg is used to attach the rotating joint element to the carrier frame, such that swivelling the belt body relative to the carrier frame about the rotating joint element moves the conveyor belt unit from the ready-to-operate configuration into the not-ready-to-operate configuration and vice versa;
wherein the rotary axis lies below an end of the belt body that extends either in, or contrary to, the transport direction.

5. The conveyor belt unit of claim 4, wherein the conveyor belt unit is arranged as one of:
a feed belt unit;
a weighing belt unit; or
a discharge belt unit.

6. A conveyor belt unit for conveying an object over a dynamic checkweigher, comprising:

a carrier frame;
a belt body, connected to the carrier frame for conveying the object, comprising:
a pair of rollers, one arranged at an end of the belt body in a transport direction and one arranged at an end contrary to the transport direction; and
a conveyor belt tensioned across the pair of rollers;
a motor arranged to drive the conveyor belt by means of one of the rollers;
a configuration-changing mechanism, effective between the belt body and the carrier frame to switch the conveyor belt unit between a not-ready-to-operate configuration and a ready-to-operate configuration, when the configuration-changing mechanism is actuated, the configuration-changing mechanism comprising at least one rotating joint element having a thin material bridge that defines a rotary axis thereof;
support elements, arranged opposite the rotating joint element, that support the belt body against the carrier frame when the conveyor belt unit is in the ready-to-operate configuration; and
a tension lever, configured for transfer between a lower snap-in position corresponding to the ready-to-operate configuration and an upper snap-in position corresponding to the not-ready-to-operate configuration, the tension lever being fixed to the belt body such that the belt body swivels when moving between the snap-in positions;
wherein the respective snap-in positions are defined in a matrix, through which an end of the tension lever, distal to the belt body, reaches, the matrix being is situated either in a side element of the carrier frame, below the support elements or the rotating joint elements; or in a cross-element of the carrier frame which lies below the support elements or the rotating joint element and connects the side elements.

7. The conveyor belt unit of claim 6, wherein, in the ready-to-operate configuration, the tension lever snaps under tension into the lower snap-in position, thereby pressing the belt body onto the support elements.

8. The conveyor belt unit of claim 6, wherein, in the not-ready-to-operate configuration, the tension lever is supported against the upper snap-in position, thereby holding the belt body in the swivelled position.

9. The conveyor belt unit of claim 6, wherein the conveyor belt unit is arranged as one of:
a feed belt unit;
a weighing belt unit; or
a discharge belt unit.

* * * * *

UNITED STATES PATENT AND TRADEMARK OFFICE
CERTIFICATE OF CORRECTION

PATENT NO. : 11,370,618 B2
APPLICATION NO. : 17/155237
DATED : June 28, 2022
INVENTOR(S) : Schwanitz et al.

It is certified that error appears in the above-identified patent and that said Letters Patent is hereby corrected as shown below:

On the Title Page

Item (30), Foreign Application Priority Data, please delete "Jan. 24, 2020 (EP) ............... 20153546" and insert -- Jan. 24, 2020 (EP) ................. 20153546.5 --.

In the Claims

In Column 7, Line 32, Claim 4, please delete "connected by having a thin" and insert -- connected by a thin --.

Signed and Sealed this
Thirtieth Day of August, 2022

Katherine Kelly Vidal
*Director of the United States Patent and Trademark Office*